US005724595A

United States Patent [19]
Gentner

[11] Patent Number: 5,724,595
[45] Date of Patent: Mar. 3, 1998

[54] SIMPLE METHOD FOR CREATING HYPERTEXT LINKS

[75] Inventor: Donald R. Gentner, Palo Alto, Calif.

[73] Assignee: Sun Microsystems, Inc., Mountain View, Calif.

[21] Appl. No.: 666,792

[22] Filed: Jun. 19, 1996

[51] Int. Cl.[6] ........................................... G06F 3/00
[52] U.S. Cl. .................... 395/762; 395/774; 395/348; 395/335
[58] Field of Search ................... 395/762, 764, 395/776–779, 326–358, 792

[56] References Cited

U.S. PATENT DOCUMENTS

| | | | |
|---|---|---|---|
| 4,982,344 | 1/1991 | Jordan | 395/346 |
| 5,159,669 | 10/1992 | Trigg et al. | 395/357 |
| 5,204,947 | 4/1993 | Bernstein et al. | 395/357 |
| 5,297,249 | 3/1994 | Bernstein et al. | 395/356 |
| 5,408,659 | 4/1995 | Cavendish et al. | 395/348 X |
| 5,481,666 | 1/1996 | Nguyen et al. | 395/349 X |
| 5,524,193 | 6/1996 | Covington et al. | 395/348 X |
| 5,530,852 | 6/1996 | Meske, Jr. et al. | 395/774 X |
| 5,538,171 | 7/1996 | Crowley | 395/774 X |
| 5,559,942 | 9/1996 | Gough et al. | 395/349 |
| 5,572,643 | 11/1996 | Judson | 395/793 |
| 5,625,781 | 4/1997 | Cline et al. | 395/335 |

OTHER PUBLICATIONS

"Adobe PageMill 2.0 Announced," *Adobe PageMill What's New*, pp. 1–22, ©1996, Adobe Systems Incorporated.
"Common Desktop Environment 1.0 Programmer's Guide," pp. 48–49, Addison–Wesley Publishing Company [published before filing date].

*Primary Examiner*—John E. Breene
*Attorney, Agent, or Firm*—Townsend and Townsend and Crew LLP

[57] ABSTRACT

An improved method and system for creating a link in an original hypertext document to a target hypertext document when a link creating icon is dragged from the target hypertext document to a specified location in the original hypertext document. The title of the target hypertext document is inserted at the link text.

13 Claims, 4 Drawing Sheets

SIMPLE METHOD FOR CREATING HYPERTEXT LINKS

BACKGROUND OF THE INVENTION

The present invention relates to link information in hypertext pages and particularly to efficient creation of links when preparing hypertext pages.

Hypertext pages typically have multiple links to other pages. Each link has an associated address identifying the page that it points to. In the context of the WWW, the associated address is typically a Universal Resource Locator (URL) of another page.

For the WWW, the links are normally displayed by a browser as colored and underlined text. This text is referred to as the link anchor and is used to inform the user about the linking possibilities from the current page. By selecting the link anchor using a pointing and selecting device such as a mouse, the user retrieves the web page pointed to by the link anchor.

Hypertext pages transferred on the WWW are ASCII text documents marked up with special HTML (Hypertext Markup Language) tags. These tags may be created utilizing a text editor such as Notepad for Windows or by using a special HTML editor such as HTML Assistant or Netscape Gold.

In HTML, links to other pages are formed by link anchor text or a link anchor image enclosed in opening and closing anchor tags, e.g., <A> link anchor text </A>, where the opening tag includes an HREF= attribute specifying the URL of the target hypertext page that is the target of the link.

When using an HTML editor the HTML tags can be formed placing the cursor at the tag location and clicking on a toolbar icon. Also, since typing URLs leads to many errors author's typically copy the URL of target page and paste the URL into the HREF= attribute field. If the title of the page is to be used as the link anchor text then the title is copied and pasted between the opening and closing anchor tags.

In one web authoring program, PageMill published by Adobe Systems Incorporated, the author enters the text link in the original page, selects the text link, and drags an icon from a target page and drops it on the selected text link in the original page to create a link from the original page to the target page. Both PageMill and Adobe are trademarks of Adobe Systems Incorporated.

As is apparent, each of these techniques for creating a link involves several steps and slows down the process of authoring web pages.

There is a great need for increasing the efficiency of authoring web pages to lower the cost of creating web sites and to make web authoring more accessible.

SUMMARY OF THE INVENTION

By virtue of the present invention, a link from page being authored to a target page may be created in one step.

A link from an original page to a target page is created by dragging an anchor link displayed in the target page and dropping the link at a specified location in the original page where the link is to be created. A link to the target page having the title of the target page as link anchor text is automatically created at the specified location.

A further understanding of the nature and advantages of the inventions herein may be realized by reference to the remaining portions of the specification and the attached drawings.

DESCRIPTION OF SPECIFIC EMBODIMENTS

Figure 1A:
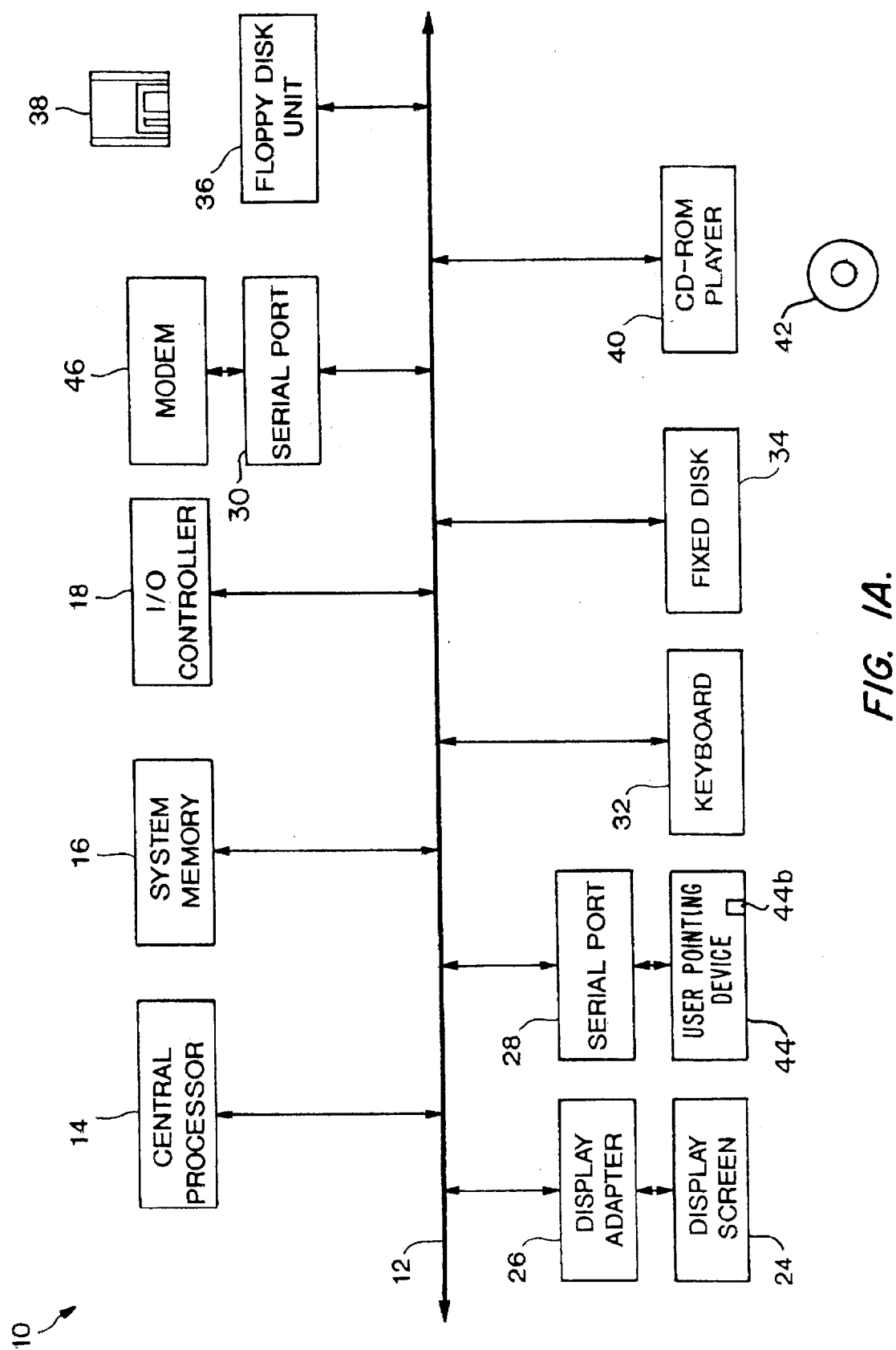
FIG. 1A depicts a block diagram of a client computer system suitable for implementing the present invention.

FIG. 1A depicts a block diagram of a client computer system 10 suitable for implementing the present invention. Client computer system 10 includes a bus 12 which interconnects major subsystems such as a central processor 14, a system memory 16 (typically RAM), an input/output (I/O) controller 18, an external device such as a display screen 24 via display adapter 26, serial ports 28 and 30, a keyboard 32, a fixed disk drive 34 and a floppy disk drive 36 operative to receive a floppy disk 38, and a CD-ROM device 40 operative to receive a CD-ROM 42. Many other devices can be connected such as a user pointing device, e.g., a mouse 44 having a select button 44s connected via serial port 28 and a modem 46 connected via serial port 30. Modem 46 may provide a direct connection to a remote server via a telephone link or to the Internet via a POP (point of presence). Alternatively, some other type of network interface system (not shown) could be used.

Many other devices or subsystems (not shown) may be connected in a similar manner. Also, it is not necessary for all of the devices shown in FIG. 1A to be present to practice the present invention, as discussed below. The devices and subsystems may be interconnected in different ways from that shown in FIG. 1A. The operation of a computer system such as that shown in FIG. 1A is readily known in the art and is not discussed in detail in this application. Software to implement the present invention may be operably disposed in system memory 16 or stored on storage media such as fixed disk 34, floppy disk 38, or CD-ROM 42.

Figure 1B:
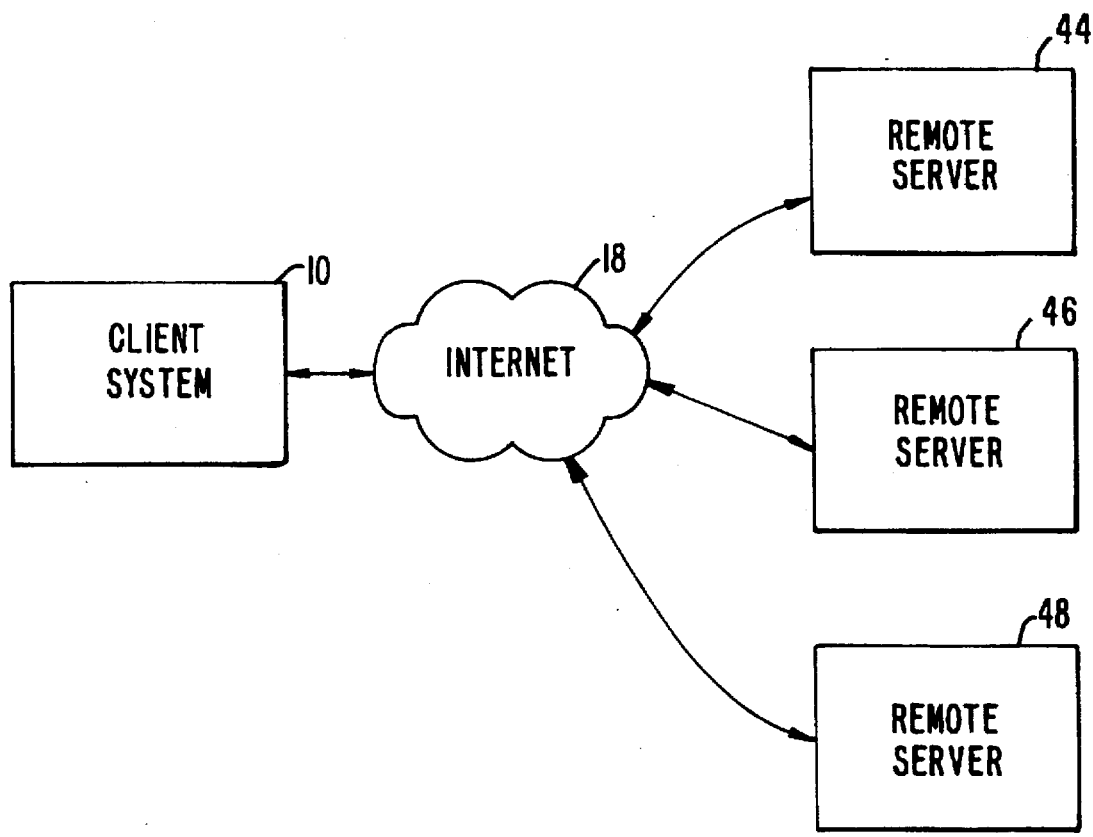
FIG. 1B depicts the interconnection of the client computer systems to remote servers.

FIG. 1B depicts the interconnection of client computer system 10 to remote servers 44, 46, and 48. FIG. 1B depicts the Internet 18 interconnecting remote servers 44, 46, and 48. Modem 46 or some other network interface system provides the connection from client computer system 10 to the Internet 18. Protocols for exchanging data via the Internet are well known and need not be discussed herein. Although FIG. 1B depicts the use of the Internet for exchanging data, the present invention is not limited to the Internet. The present invention may be implemented in the context of any network environment or within a single computer.

The present invention will be illustrated in the context of a system for authoring web pages. In the specific embodiment described below the invention is implemented in the What-You-See-Is-What-You-Get (WYSIWYG) web authoring program such as PageMill.

Figure 2:
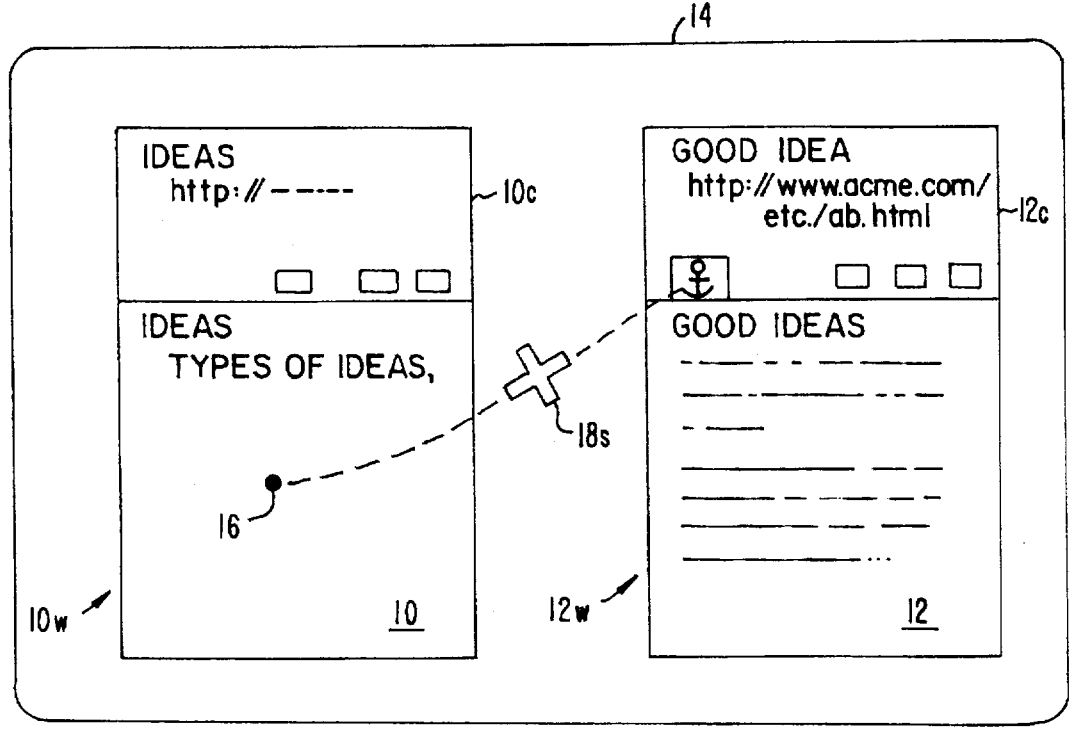
FIG. 2 depicts a black and white rendition of a CRT screen including original and target hypertext pages before creating a link.
Figure 3:
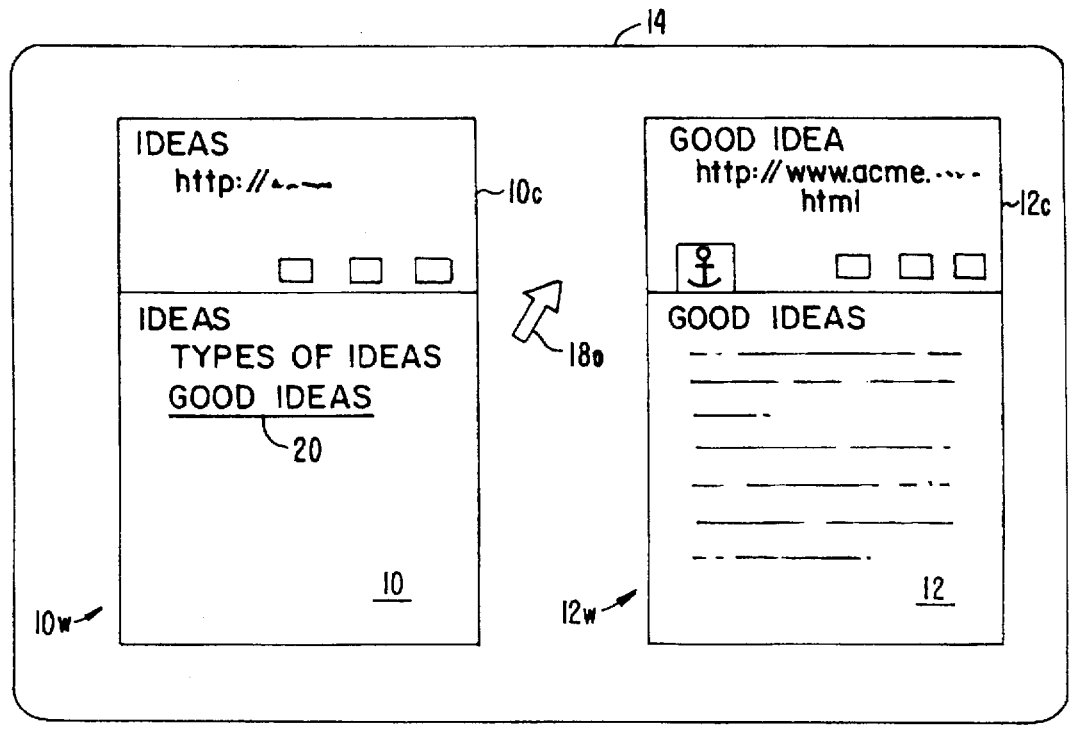
FIG. 3 depicts a black and white rendition of a CRT screen including original and target hypertext pages after creating a link.
Figure 4:
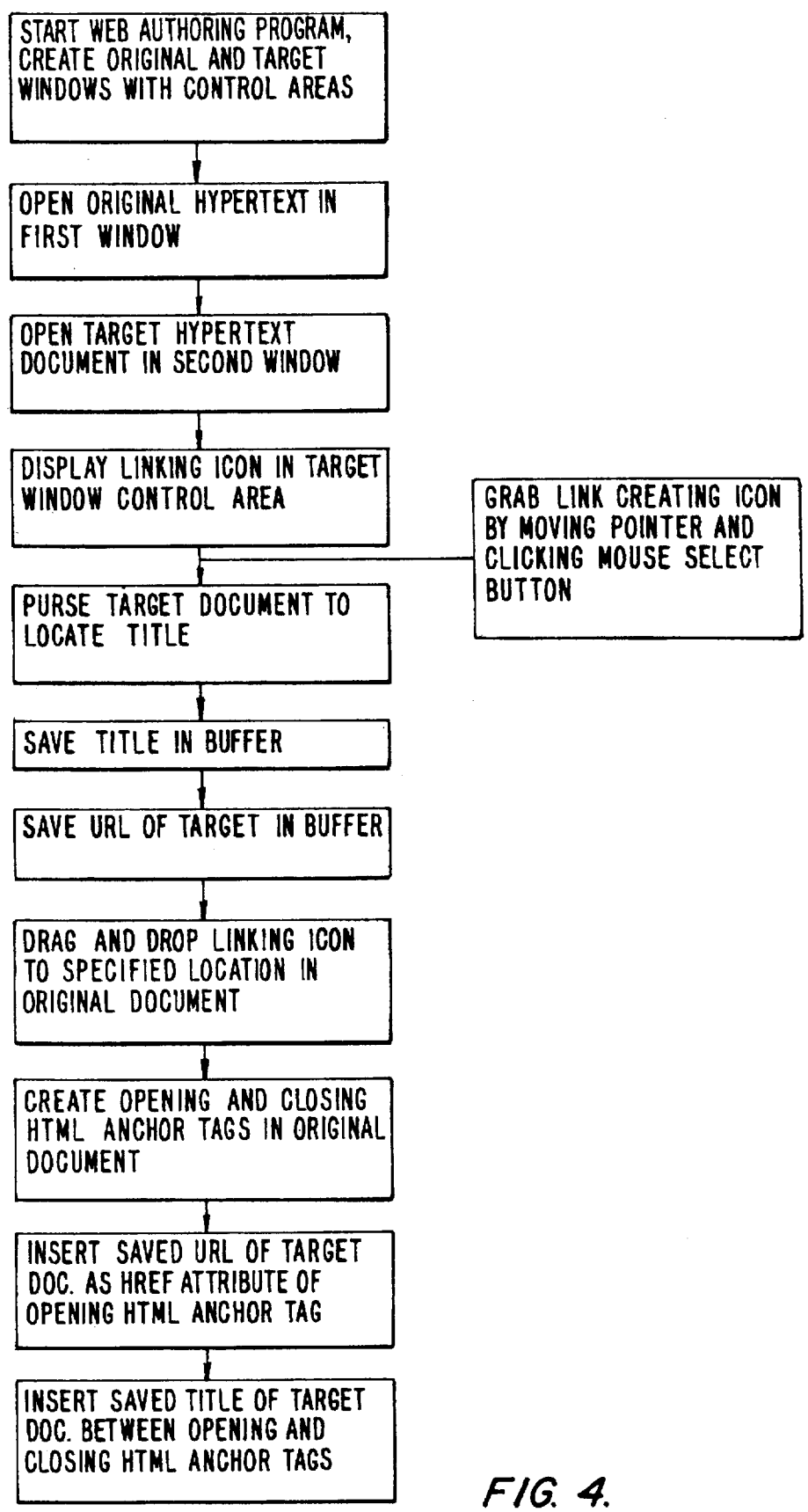
FIG. 4 depicts a flowchart describing steps of creating a link in one step.

The creation of link in a single step will now be describe with reference to FIGS. 2–4. FIG. 2 depicts original and target hypertext pages 10 and 12 displayed in original and target windows 10w and 12w, respectively, on a CRT screen 14 while a web author is utilizing the web authoring program to author the original page. Each window 10w and 12w includes a display area for displaying the text of a document and a control area 10c and 12c containing control icons including a link creating graphic icon 18, called the "drag target," which in the preferred embodiment is a representation of a ship's anchor.

In this example, the web author wishes to create an HTML link to the target page 12 at the specified location 16 in the original page.

The HTML form of the original page is:
```
<HTML>
<HEAD>
<TITLE> Ideas </TITLE>
</HEAD>
<BODY>
<Hi> Types of Ideas </Hi>
</BODY>
</HTML>
```
and the HTML form of the target page is:
```
<HTML>
<HEAD>
<TITLE> Good Ideas </TITLE>
</HEAD>
<BODY>
[some text describing good ideas]
</BODY>
</HTML>.
```

As depicted in FIGS. 2 and 3, the link creating icon 18 is displayed control area 12c in the target window 12w. In the method of the present invention, the HTML text of the target document is parsed and the title text, bracketed by the opening and closing HTML TITLE tags, and the target URL, in this example "http://www.acme.com/etc/ab.html", of the target page are stored in a buffer in memory.

When the user wishes to create a link to the target document, the mouse cursor is moved over the drag target in the control area of the target window and presses the select button on the mouse. The title and URL of the target hypertext page are stored in a memory buffer. At that point, optionally, the shape of the mouse pointer could change from an original shape 18o (FIG. 4) to a special shape 18s (FIG. 3) to indicate that it has "grabbed" the target page.

Next, the user moves the mouse pointer to the desired location the original hypertext page 12, displayed in a original window 12w, while continuing to depress the select button 44s on the mouse 44. When the user releases the mouse button 44s with the pointer over the specified location 16 of the original hypertext page 10 there actions take place:

1. the mouse pointer reverts to its normal shape, indicating that the target has been "dropped";
2. the title of the target page is inserted into the text of the original page at the location of the mouse pointer; and
3. the title of the target page is underlined and shown in a special color (normally blue) to indicate that it is a hypertext link.

When a user drags and drops the link creating icon 18 from the target page 12 to the specified location 16 in the original page 10 opening and closing HTML anchor tags are inserted into the original page 10 at the specified location 16. The URL of the target page 12 is copied from the buffer to the HREF= attribute of the opening anchor tag. Additionally, the title text is copied from the buffer and inserted between the opening and closing HTML anchor links as the anchor text of the link 20 to the target page. The title of the target page is then displayed as a link 20 in the original page 10.

The HTML form of the original page after the one-step creation of the link 20 is:

```
<HTML>
<HEAD>
<TITLE> Ideas </TITLE>
</HEAD>
<BODY>
<Hi> Types of Ideas </Hi>
</BODY>
<A HREF="http://wwww.acme.com/etc/ab.html"> Good Ideas </A>
</HTML>
```

Thus, a link to the target page 12 is created in the original page 10 by the single step of dragging and dropping the anchor icon 18 to the specified location 16 in the original page 10.

If it is desired to change the text of the link anchor the web author may edit the text of the link anchor without affecting the function of the link. Further, if the title of the target page is changed the link will still function if the URL of the target page is not changed.

The sequence of drag-and-drop actions described above can be implemented using the normal drag-and-drop protocols provided by any of the standard PC graphical user interfaces. For example, when implementing the invention on a computer system using the Common Desktop Environment (CDE) version of Motif, the programmer could use either the Motif 1.2 drag-and-drop API (Application Programming Interface) or the CDE drag-and-drop API.

These APIs manage the configuration and appearance of the drag icons, define the buffers for storing the target hypertext page title and URL, and allow the programmer to define the drag target and drop target. These are standard techniques described in reference manuals for each computer system, such as the Common Desktop Environment 1.0 Programmer's Guide by the CDE Documentation Group (IBM, HEWLETT-PACKARD, SUNSOFT, NOVELL) published by Addison-Wesley Publishing Co. Reading, Mass. (1995).

In the foregoing specification, the invention has been described with reference to specific exemplary embodiments thereof. It will, however, be evident that various modifications and changes may be made thereunto without departing from the broader spirit and scope of the invention as set forth in the appended claims.

Furthermore, the flowcharts described herein are illustrative of merely the broad logical flow of steps to achieve a method of the present invention and that steps may be added to, or taken away from, the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as Java, "C", Pascal, FORTRAN, assembly language, etc., may be used. Further, various programming approaches such as procedural, object oriented or artificial intelligence techniques may be employed. The software for implementing the steps described above is implemented as computer readable code stored on a computer readable storage medium included in a computer such as the system depicted in FIG. 1A.

Many such changes or modifications will be readily apparent to one of ordinary skill in the art. The specification and drawings are, accordingly, to be regarded in an illustrative rather than a restrictive sense, the invention being limited only by the provided claims and their full scope of equivalents.

What is claimed is:

1. In a hypertext authoring system wherein original and target hypertext pages are displayed, with the address of the target hypertext page specified by a target URL and with the title of the target hypertext page enclosed by opening and closing hypertext title tags, an improved computer-implemented method for creating a hypertext link to said hypertext target page at a specified location in said original hypertext page comprising the steps of:

displaying a link creating icon for the target hypertext page;

automatically creating a link from the original hypertext page to the target hypertext page at said specified location in the original page when said link creating icon is dragged from said target hypertext page and dropped at said specified location, with the link including the URL of said target hypertext page;

automatically inserting the title text of said target hypertext page at said link.

2. In a hypertext authoring system wherein original and target hypertext pages are displayed, with the address of the target hypertext page specified by a target URL and with the title of the target hypertext page enclosed by opening and closing hypertext title tags, an improved computer-implemented method for creating a hypertext link to said hypertext target page at a specified location in said original hypertext page comprising the steps of:

displaying a link creating icon for the target hypertext page;

automatically creating opening and closing hypertext anchor links at said specified location in the original page and inserting the URL of said target hypertext page as the HREF attribute of said opening anchor link when said link creating icon is dragged from said target hypertext page and dropped at said specified location; and automatically inserting the title text of said target hypertext page between the opening and closing anchor links created in said original hypertext page.

3. The computer-implemented method of claim 2 further comprising the steps of:

storing the title and URL of the target hypertext document in a buffer when the link creating icon is grabbed;

writing the title of the target hypertext document stored in the buffer at the specified location when the link creating document is dropped at the specified location; and writing the target URL to the HREF= attribute field of the opening HTML anchor link when the link creating icon is dropped at the specified location.

4. The computer-implemented method of claim 2 further comprising:

displaying said original and target hypertext pages in original and target windows, respectively, and forming control areas in said original and target windows; and displaying said link creating icon in said control area of said target window.

5. The computer-implemented method of claim 3 implemented in a computer utilizing a pointing device to move a displayed pointer, said method further comprising the steps of:

changing the shape of a pointer from an original shape to a different shape when the link creating icon is grabbed; and changing the shape of the pointer from the different shape to the original shape when the link creating icon is dropped at the specified location.

6. A computer program product article of manufacture comprising:

a computer usable medium having a computer readable code embodied thereon for causing the automatic creation of a hypertext link to a target hypertext page at a specified location in an original hypertext page for use in a hypertext authoring system wherein original and target hypertext pages are displayed, with the address of the target hypertext page specified by a target URL and with the title of the target hypertext page enclosed by opening and closing hypertext title tags, the computer program product article of manufacture comprising:

computer readable program code devices configured to cause a computer to effect displaying a link creating icon for the target hypertext page;

computer readable program code devices configured to cause a computer to effect automatically creating opening and closing hypertext anchor links at said specified location in the original page and inserting the URL of said target hypertext page as the HREF attribute of said opening anchor link when said link creating icon is dragged from said target hypertext page and dropped at said specified location; and computer readable program code devices configured to cause a computer to effect automatically inserting the title text of said target hypertext page between the opening and closing anchor links created in said original hypertext page.

7. The computer program product of claim 6 further comprising:

computer readable program code devices configured to cause a computer to effect storing the title and URL of the target hypertext document in a buffer when the link creating icon is grabbed;

computer readable program code devices configured to cause a computer to effect writing the title of the target hypertext document stored in the buffer at the specified location when the link creating document is dropped at the specified location; and computer readable program code devices configured to cause a computer to effect writing the target URL to the HREF= attribute field of the opening HTML anchor link when the link creating icon is dropped at the specified location.

8. The computer program product of claim 6 further comprising:

computer readable program code devices configured to cause a computer to effect displaying said original and target hypertext pages in original and target windows, respectively, and forming control areas in said original and target windows; and computer readable program code devices configured to cause a computer to effect displaying said link creating icon in said control area of said target window.

9. The computer-implemented method of claim 8 implemented in a computer utilizing a pointing device to move a displayed pointer, said method further comprising the steps of:

computer readable program code devices configured to cause a computer to effect changing the shape of a pointer from an original shape to a different shape when the link creating icon is grabbed; and computer readable program code devices configured to cause a computer to effect changing the shape of the pointer from the different shape to the original shape when the link creating icon is dropped at the specified location.

10. A computer system article of manufacture comprising:

a display for displaying original and target hypertext pages;

a processing system that causes the automatic creation of a hypertext link to a target hypertext page at a specified location in an original hypertext page for use in a hypertext authoring system wherein original and target hypertext pages are displayed, with the address of the target hypertext page specified by a target URL and with the title of the target hypertext page enclosed by opening and closing hypertext title tags by virtue of being configured to:

automatically create opening and closing hypertext anchor links at said specified location in the original page and inserting the URL of said target hypertext page as the HREF attribute of said opening anchor link when said link creating icon is dragged from said target hypertext page and dropped at said specified location; and automatically insert the title text of said target hypertext page between the opening and closing anchor links created in said original hypertext page.

11. The computer system of claim 10 wherein the processing system is further configured to:

store the title and URL of the target hypertext document in a buffer when the link creating icon is grabbed;

write the title of the target hypertext document stored in the buffer at the specified location when the link creating document is dropped at the specified location; and write the target URL to the HREF= attribute field of the opening HTML anchor link when the link creating icon is dropped at the specified location.

12. The computer system of claim 10 wherein said processing system is further configured to:

display said original and target hypertext pages in original and target windows, respectively, and forming control areas in said original and target windows; and display said link creating icon in said control area of said target window.

13. The computer system of claim 12 further comprising:

a pointing device to move a displayed pointer, and with said processing system further configured to:

change the shape of a pointer from an original shape to a different shape when the link creating icon is grabbed; and change the shape of the pointer from the different shape to the original shape when the link creating icon is dropped at the specified location.

* * * * *